United States Patent
Ravi et al.

(10) Patent No.: US 9,123,029 B2
(45) Date of Patent: Sep. 1, 2015

(54) DELAYED DISPLAY OF ELECTRONIC MESSAGES

(71) Applicant: International Business Machines Corporation, Armonk, NY (US)

(72) Inventors: Kumar Ravi, Williamson, TX (US); Amir Farrokh Sanjar, Travis, TX (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 13/644,069

(22) Filed: Oct. 3, 2012

(65) Prior Publication Data

US 2014/0095631 A1    Apr. 3, 2014

(51) Int. Cl.
*G06F 15/16* (2006.01)
*G06Q 10/10* (2012.01)
*H04L 12/58* (2006.01)
*H04N 21/4784* (2011.01)

(52) U.S. Cl.
CPC .......... *G06Q 10/107* (2013.01); *H04L 12/5855* (2013.01); *H04L 51/12* (2013.01); *H04N 21/4784* (2013.01); *H04L 12/5845* (2013.01)

(58) Field of Classification Search
CPC . H04L 12/5845; H04L 12/5855; H04L 51/12; H04N 21/4784; H04W 4/16
USPC ........................................................ 709/206
See application file for complete search history.

(56) References Cited

U.S. PATENT DOCUMENTS

| 7,890,085 | B2 | 2/2011 | Chiu et al. | |
| 2006/0019638 | A1* | 1/2006 | Chiu et al. | 455/412.2 |
| 2010/0057872 | A1* | 3/2010 | Koons et al. | 709/206 |

FOREIGN PATENT DOCUMENTS

EP    1617359 A1    1/2006

OTHER PUBLICATIONS

Steve Krause, How to Delay or Schedule Delivery of Email Using Outlook, groovyPost.com, http://www.groovypost.com/howto/microsoft/outlook/delay-defer-schedule-email-in-outlook-sending/, Jun. 9, 2009.
Compose and Send SMS Text Messages, ipip.com, http://www.ipipi.com/help/compose_sms.htm, Last Retrieved: Aug. 22, 2012.

* cited by examiner

*Primary Examiner* — Yves Dalencourt
(74) *Attorney, Agent, or Firm* — Kunzler Law Group

(57) ABSTRACT

An apparatus for delaying a message includes a receiver module, a delay determination module, a storage module, and a display module. The receiver module receives an electronic message. The delay determination module determines if the message includes a request to delay displaying the message. The request includes a requested delay. The storage module stores the message prior to queuing for display in response to the delay determination module determining that the message includes a requested delay. The message is stored in a computer readable storage media accessible to a computing device receiving the message. The display module queues the message for display after the requested delay. In one embodiment, at least a portion of the receiver module, the delay determination module, the storage module, and the display module include hardware and/or executable code where the executable code is stored on one or more computer readable storage media.

20 Claims, 7 Drawing Sheets

DELAYED DISPLAY OF ELECTRONIC MESSAGES

FIELD

The subject matter disclosed herein relates to electronic messages and more particularly relates to delayed delivery of electronic messages.

BACKGROUND

Description of the Related Art

Electronic messages, such as text messages and email, are typically sent and received within a matter of seconds. Most of the time a sender wants the message to be delivered as soon as possible. Once the message is sent, the message may be delayed due to high network traffic, network outages, or other problems so that a sent message may be delivered later than anticipated. It may also be desirable to delay sending a message. For example, a sender may want create a message and have the message arrive at a receiving device at a later time. For instance, the sender may want to create a message while the sender is thinking about the message to be sent and may also want to have the message appear in the receiver's inbox at a later time. However, at the time that the message is to be sent, the sender may not be available, a device sending the message may have problems, such as having a battery charge that is too low for the sending device to send the message, there may be an outage in the digital communication network connecting the sending device and receiving device, and the like.

BRIEF SUMMARY

An apparatus for delaying a message includes a receiver module, a delay determination module, a storage module, and a display module. The receiver module receives an electronic message. The message is received over a digital communication network and the message is received at a computing device. The computing device includes an electronic display for a user to view electronic messages and a processor to process electronic messages for display on the on the electronic display. The delay determination module determines if the message includes a request to delay displaying the message. The request includes a requested delay.

The storage module stores the message prior to queuing for display in response to the delay determination module determining that the message includes a requested delay. The message is stored in a computer readable storage media accessible to the computing device. The display module queues the message for display after the requested delay. In one embodiment, at least a portion of the receiver module, the delay determination module, the storage module, and the display module include hardware and/or executable code where the executable code is stored on one or more computer readable storage media.

The apparatus, in one embodiment, includes a delay acceptance module that configures the computing device to accept messages with a requested delay or to reject messages with a requested delay. The apparatus, in a further embodiment, includes a refusal module that, in response to the delay acceptance module configuring the computing device to reject messages with a requested delay, rejects a message with a requested delay or indicates a refusal after receiving a communication seeking to determine if the computing device is configured to receive messages with a requested delay. In another embodiment, the refusal module rejecting a message with a requested delay includes sending a reply to a sending device that sent the message with the requested delay. The reply includes information that the computing device is not configured to receive messages with a requested delay.

In one embodiment, the message includes a short message service ("SMS") message. In another embodiment, the message includes an email. In another embodiment, the requested delay includes a specific time when the message is to be displayed. In another embodiment, the requested delay includes an amount of time to delay display of the message. In one example, the computing device includes a mobile electronic device and the digital communication network includes a mobile telephone network and/or a wireless network. In another embodiment, the apparatus includes the computing device and the display.

A method for communication includes receiving an electronic message. The message is received over a digital communication network and the message is received at a computing device. The computing device includes an electronic display for a user to view electronic messages and a processor to process electronic messages for display on the on the electronic display. The method includes, in one embodiment, determining if the message includes a request to delay displaying the message and the request includes a requested delay. The method includes storing the message prior to queuing for display in response to determining that the message includes a requested delay. The message may be stored on a computer readable storage media accessible to the computing device. The method, in one embodiment, includes queuing the message for display after the requested delay.

The method, in one embodiment, includes configuring the computing device to accept messages with a requested delay or reject messages with a requested delay. In a further embodiment, the method includes rejecting, in response to the computing device being configured to reject messages with a requested delay, a message with a requested delay and/or a message seeking to determine if the computing device is configured to receive messages with a requested delay. In another embodiment, rejecting a message with a requested delay includes sending a reply to a sending device that sent the message with requested delay. The reply includes information that the computing device is not configured to receive messages with a requested delay.

In one embodiment, the message includes one of a short message service ("SMS") message and an email. In another embodiment, the requested delay includes a specific time when the message is to be displayed. In another embodiment, the requested delay includes an amount of time to delay display of the message.

An apparatus for sending messages with a delay includes a message configuration module, a request transmission module, an immediate message transmission module, and a delayed delivery module. The message configuration module configures an electronic message with a request to delay displaying the message. The request includes a requested delay. The request transmission module transmits, to a computing device over a digital communication network, a request to deliver a message with a requested delay. The request includes the message with the requested delay or a communication requesting confirmation that the computing device is configured to accept messages with a requested delay. The computing device includes a display and a processor to process electronic messages for display on the display.

The immediate message transmission module transmits the message with the requested delay in response to receiving a response that the computing device is configured to receive messages with a requested delay and where the request includes a communication requesting confirmation that the computing device is configured to receive a message with a requested delay. The delayed delivery module delays delivery to the computing device of the message with the requested delay until after the requested delay in response to receiving a response that includes information that the computing device is not configured to receive messages with a requested delay.

In one embodiment, the delayed delivery module stores the message, prior to delivery to the computing device, on a computer readable storage media accessible to a sending device and/or a computer readable storage media within the digital communication network. In another embodiment, the message configuration module includes a user interface to allow a user to configure the requested delay.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
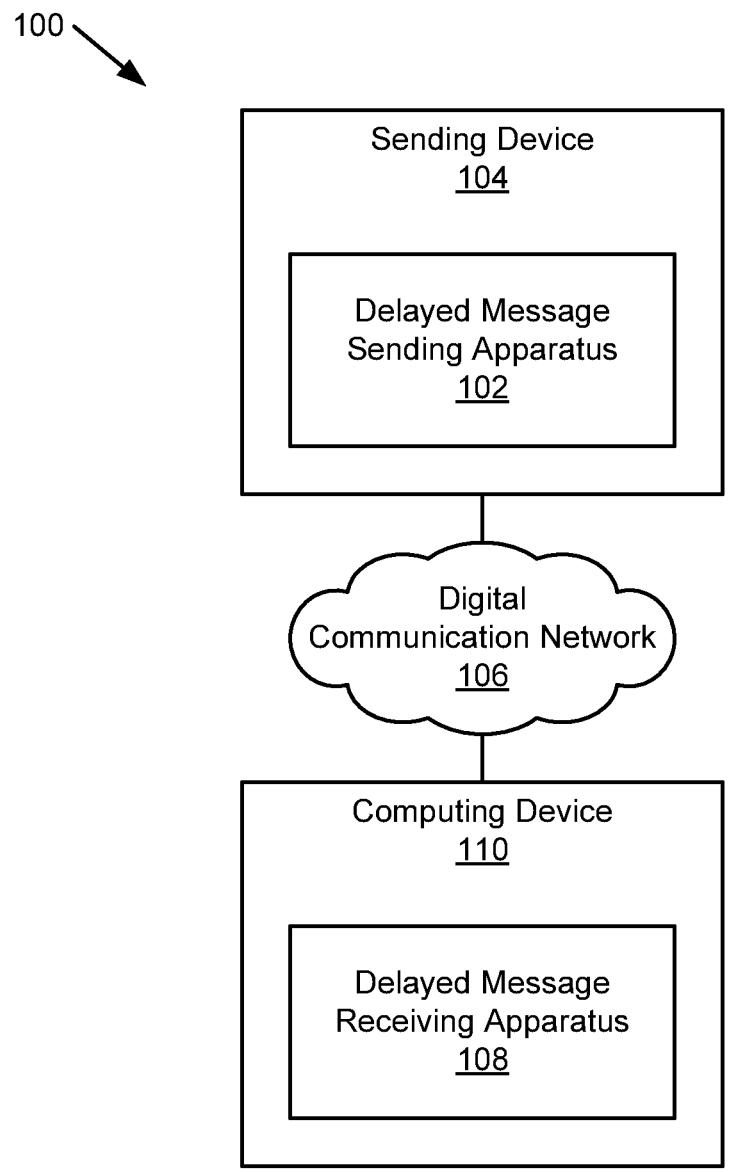
FIG. 1 is a schematic block diagram illustrating one embodiment of a system for delayed messages.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electromagnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 is a schematic block diagram illustrating one embodiment of a system 100 for delayed messages. The system 100 includes a delayed message sending apparatus 102 in a sending device 104, a digital communication network 106, and a delayed message receiving apparatus 108 in a computing device 110, which are described below.

In one embodiment, the system 100 includes a delayed message sending apparatus 102 that configures an electronic message to be sent with a request to delay displaying the message. The delayed message sending apparatus 102, in one embodiment, is in a sending device 104. The sending device 104 may be a computer, a phone, a server, a laptop computer, a tablet computer, or other electronic device capable of sending an electronic message. The electronic message, in various embodiments may include a short message service ("SMS") message, an email, a photograph, a data file, a music file, or other code in a digital format.

The delayed message sending apparatus 102, in another embodiment, includes elements in more than one device. For example, the delayed message sending apparatus 102 may be distributed between a client and a server where some functions of the delayed message sending apparatus 102 are resident in the server.

The system 100 includes a digital communication network 106 that transmits electronic messages and other digital communications from the sending device 104 to the computing device 110. The digital communication network 106 may include a wireless network, such as a wireless telephone network, a local wireless network such as a Wi-Fi network, a Bluetooth® network, and the like. The digital communication network 106 may include a wide area network ("WAN"), a storage area network ("SAN"), a local area network ("LAN"), an optical fiber network, the internet, or other digital communication network known in the art. The digital communication network 106 may include two or more networks. The digital communication network 106 includes one or more servers, routers, switches, and other networking equipment. The digital communication network 106 may also include computer readable storage media, such as a hard disk drive, an optical drive, non-volatile memory, random access memory ("RAM"), or the like.

The system 100 includes a delayed message receiving apparatus 108 in a computing device 110. The delayed message receiving apparatus 108 may determine if an electronic message includes a request for delayed display of the message and may comply with the requested delay, or may reject the message or other action if the computing device 110 is configured to not accept messages with a delay.

The computing device 110 may be a mobile phone, a notebook computer, a laptop computer, a desktop computer, a server, or other device configured to receive electronic messages over a digital communication network 106. The delayed message receiving apparatus 108 may be in the computing device 110 as shown or distributed among two or more devices. For example, a device within the digital communication network 106, such as a server within mobile phone communications network may determine if the computing device 110 is allowed to receive messages with a delayed display.

Figure 2:
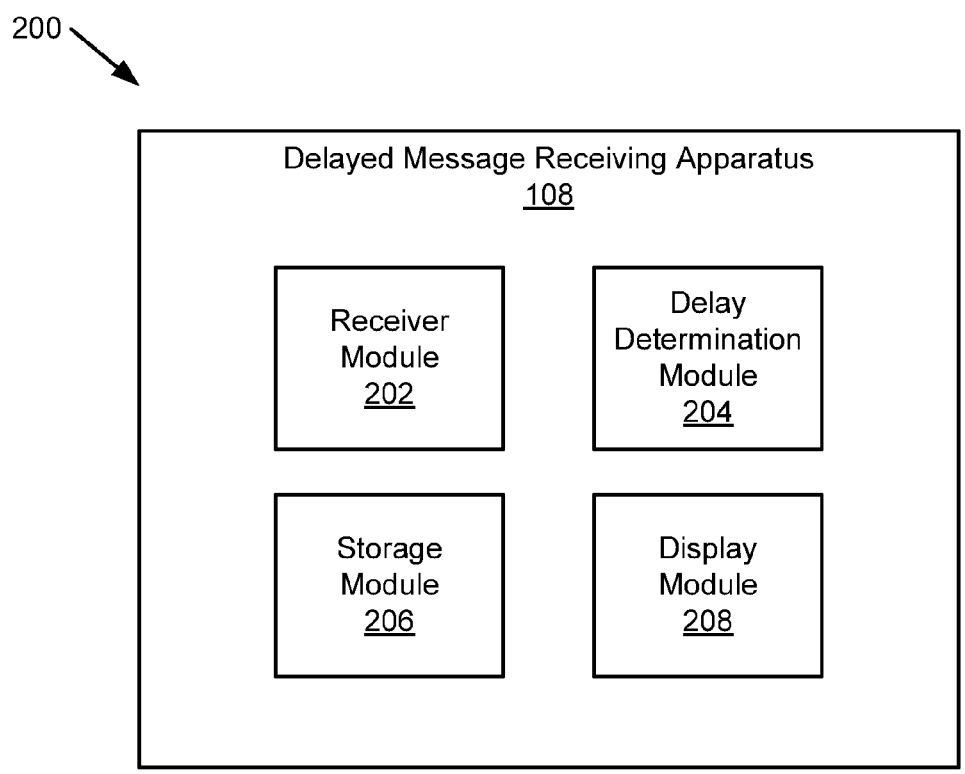
FIG. 2 is a schematic block diagram illustrating one embodiment of a delayed message receiving apparatus.

FIG. 2 is a schematic block diagram illustrating one embodiment of an apparatus 200 that includes a delayed message receiving apparatus 108. The delayed message receiving apparatus 108 may include a receiver module 202, a delay determination module 204, a storage module 206, and a display module 208, which are described below.

The apparatus 200, in one embodiment, includes a receiver module 202 that receives an electronic message. The message is received over a digital communication network 106. The message is also received at a computing device 110. The computing device 110 includes an electronic display for a user to view electronic messages and a processor to process electronic messages for display on the on the electronic display. For example, the computing device 110 may be a mobile telephone and the message may be a short message service ("SMS") message, which may be known as a text message. The computing device 110 may also be a laptop computer, a notebook computer, a desktop computer, and the like.

In one embodiment, the apparatus 200 includes a delay determination module 204 that determines if the message includes a request to delay displaying the message. In one embodiment, the request includes a requested delay. For example, the requested delay may be an amount of time. For instance, the requested delay may be a delay of three days. In this instance, the request to delay displaying the message may be a request to delay displaying the message for three days from the time that the receiver module 202 received the message.

In another embodiment, the requested delay may include a particular time and/or date to display the message. For example, if the message is a "happy birthday" message, the requested delay may specify a date that corresponds to the birthday of a person that is the recipient of the message. The requested delay may also include a specific time of day to display the message. The requested delay may also include a specific time as well as a time delay. For example, the requested delay may request that a message is to be displayed a certain amount of time after a specific date and/or time. One of skill in the art will recognize other forms of a requested delay.

The requested delay and/or request to delay display of the message, in one embodiment, may be included in a message header. For example, the header may include a code indicating a requested delay. In another example, the header may include a bit indicating a requested delay and another field may include the requested delay. In another embodiment, the requested delay and/or request to delay display of the message may be in a separate communication. For example, the receiver module 202 may receive a communication related to the message that includes the requested delay and/or a request to delay display of the message. In one embodiment, the communication may be related to the message. For example, the communication may include a reference number that is also included in the message so that the communication is associated with the message. In another embodiment, the communication may merely determine if the computing device 110 is configured to receive messages with a request to delay display of the message. In one embodiment, the communication is handled by the computing device 110 without user intervention. In another embodiment, the communication requires user input.

The apparatus 200, in one embodiment, includes a storage module 206 that stores the message prior to display in response to the delay determination module 204 determining that the message includes a requested delay. The storage module 206 stores the message in a computer readable storage media accessible to the computing device 110. For example, the storage module 206 may store the message in RAM, on a hard disk drive, on a flash drive, or the like. The storage module 206, in one embodiment, stores the message on a non-volatile storage device so that if the computing device 110 is shut down or loses power, the apparatus 200 can access the message after the computing device 110 is restarted. In another embodiment, the storage device 206 may store the message in volatile memory, such as RAM. For example, if the storage device 206 or apparatus 200 determines that the requested delay is short, the storage device 206 may store the message in volatile memory.

In one embodiment, the apparatus 200 includes a display module 208 that queues the message for display after the requested delay. For example, the display module 208 may include a timer and the display module 208 may retrieve and queue the message for display after expiration of a requested delay as determined by the timer. In another embodiment, the display module 208 accesses a date and time function of the computing device 110 and determines if a current date and/or time matches the requested delay. If the display module 208 determines that a date and/or time in the requested delay matches the current date and/or time, the display module 208 may queue the message for display.

Queuing the message for display may include signaling a user that the message is ready for display. For example, if the message is a text message, the display module 208 may signal that the message is ready for display by playing an audio tone, by displaying an indicator that a text message is available, by displaying a portion of the message, etc. In another embodiment, queuing the message for display may also include displaying the message. For example, the display module 208 may automatically display the message. The display module 208 may display the message on the electronic display of the computing device 110. In another embodiment, the display module 208 plays audio from the message on speakers controlled by the computing device 110. One of skill in the art will recognize other ways that the display module 208 may determine if the requested delay has expired and then retrieve and queue the message for display.

The apparatus 200 is advantageous over conventional message systems because a message with a requested delay may be stored locally on a computer readable storage device accessible to the computing device 110 before display so there is a greater chance that the message will be displayed at the requested time or after the requested delay. Other message systems that store a message with a requested delay on a sending device 104 before display of the message may be less reliable because at the time that the message is to be sent by the sending device 104 to the computing device 110 for display, the sending device 104 may be in an off state, may be disconnected from a digital communication network 106, may be offline, etc.

Figure 3:
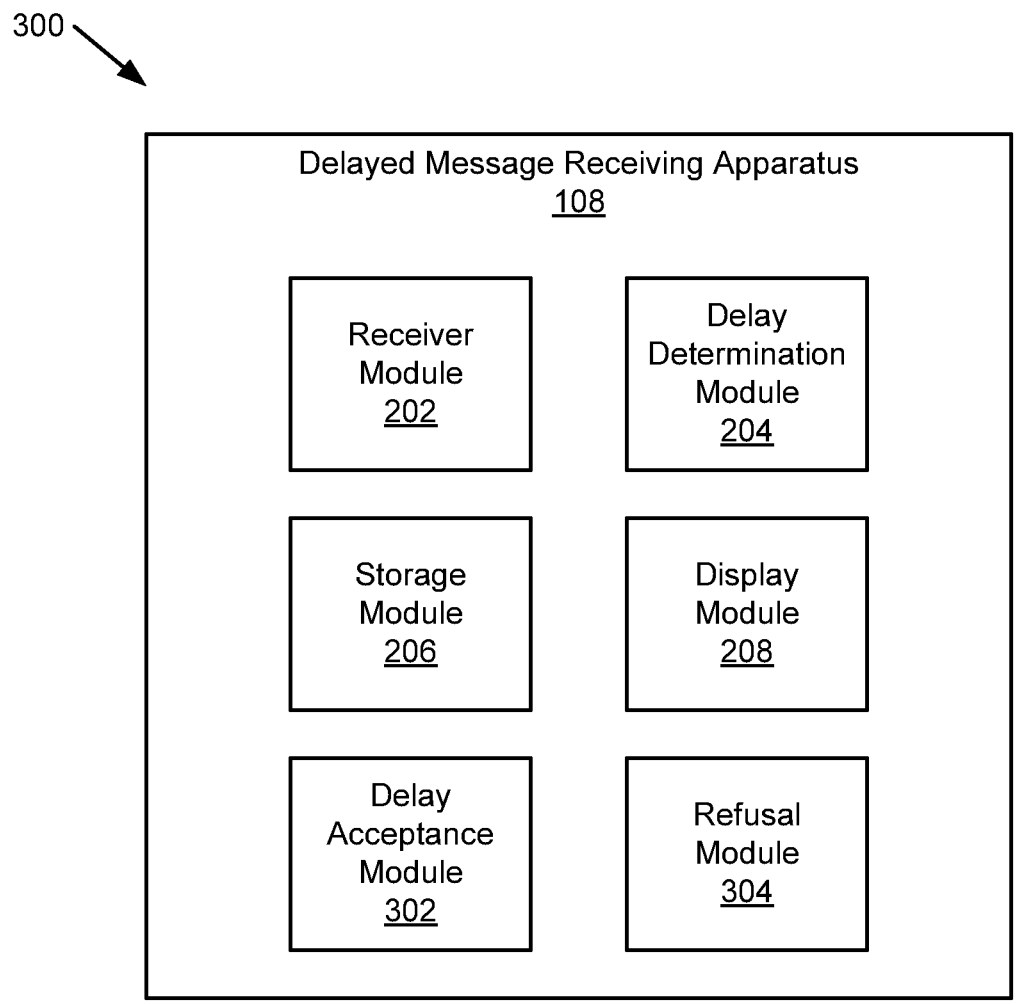
FIG. 3 is a schematic block diagram illustrating another embodiment of a delayed message receiving apparatus.

FIG. 3 is a schematic block diagram illustrating another embodiment of an apparatus 300 with another embodiment of a delayed message receiving apparatus 108. The delayed message receiving apparatus 108 may include a receiver module 202, a delay determination module 204, a storage module 206, and a display module 208, which are substantially similar to those described in relation to the apparatus 200 of FIG. 2. In various embodiments, the apparatus 300 may include a delay acceptance module 302 and/or a refusal module 304, which are described below.

In one embodiment the apparatus 300 includes a delay acceptance module 302 that configures the computing device 110 to either accept messages with a requested delay or to reject messages with a requested delay. For example, if the delay acceptance module 302 configures the computing device 110 to accept messages with a requested delay, the delay acceptance module 302 may enable one or more of the receiver module 202, the delay determination module 204, the storage module 206, and/or the display module 208 to process, store, and display messages after a requested delay.

In another example, if the delay acceptance module 302 configures the computing device 110 to reject messages with a requested delay, the computing device 110 may receive messages without a requested delay while rejecting messages with a requested delay. In another example, if the delay acceptance module 302 configures the computing device 110 to reject messages with a requested delay, the computing device 110 may display messages with a requested delay without waiting the requested delay period or may queue messages for display to be displayed by a user without regard to the requested delay.

In one embodiment, the delay acceptance module 302 configures the computing device 110 to accept messages with a requested delay from particular sources while rejecting messages with a requested delay from other sources. For example, the delay acceptance module 302 may allow messages with a requested delay from known senders, senders with a particular security certificate, from senders that are friends and family, or the like. One of skill in the art will recognize other ways that the delay acceptance module 302 may configure the computing device 110 to accept particular messages with a requested delay.

In one embodiment, the apparatus 300 includes a refusal module 304 that rejects a message with a requested delay in response to the delay acceptance module 302 configuring the computing device 110 to reject messages with a requested delay. In another embodiment, when the delay acceptance module 302 configures the computing device 110 to reject messages with a requested delay, the refusal module 304 indicates a refusal after receiving a communication seeking to determine if the computing device 110 is configured to receive messages with a requested delay. For example, the refusal module 304 may reject a message with a requested delay by sending a reply to the sending device 104 that sent the message with requested delay. The reply may include information that the computing device 110 is not configured to receive messages with a requested delay. One of skill in the art will recognize other ways that the refusal module 304 may refuse a message with a requested delay or may respond to a communication seeking to determine if the computing device 110 is configured to accept messages with a requested delay.

Figure 4:
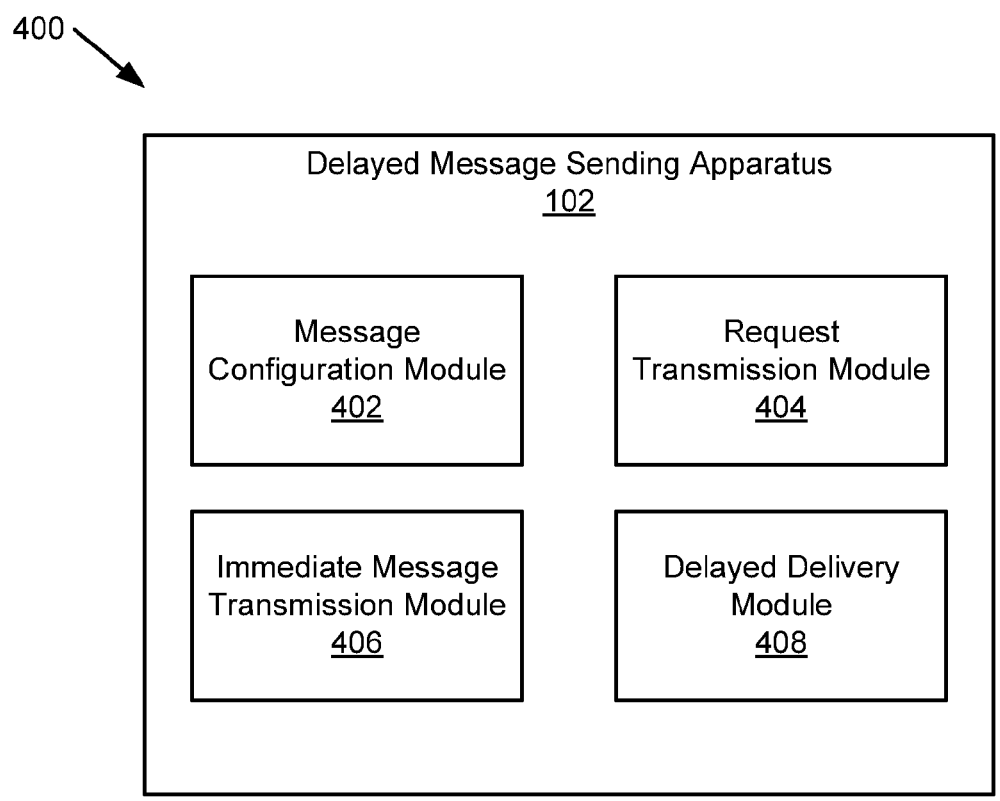
FIG. 4 is a schematic block diagram illustrating an embodiment of a delayed message sending apparatus.

FIG. 4 is a schematic block diagram illustrating an embodiment of an apparatus 400 with a delayed message sending apparatus 102. The delayed message sending apparatus 102, in one embodiment, includes a message configuration module 402, a request transmission module 404, an immediate message transmission module 406, and a delayed delivery module 408, which are described below.

In one embodiment, the apparatus 400 includes a message configuration module 402 that configures an electronic message with a request to delay displaying the message. The request includes a requested delay. In one embodiment, the requested delay may be an amount of time. For example, the requested delay may be a delay of three days. In this example, the request to delay displaying the message may be a request to delay displaying the message for three days from a time that the apparatus 400 sends the message or when a computing device 110 receives the message.

In another embodiment, the requested delay may include a particular time and/or date to display the message. For example, if the message is a "happy anniversary" message, the requested delay may specify a date that corresponds to an anniversary of a person that is the recipient of the message. The requested delay may also include a specific time of day to display the message or to display an indicator that a computing device 110 has received a new message. The requested delay may also include a specific time as well as a time delay. For example, the requested delay may request that a message is to be displayed or queued for display a certain amount of time after a specific date and/or time. One of skill in the art will recognize other forms of a requested delay.

In one embodiment, the message configuration module 402 includes the requested delay and/or request to delay display of the message in a message header. For example, the message configuration module 402 may include in the header a code indicating a requested delay. For instance, the code may be in a field that is unused in current protocol and is configurable. In another example, the message configuration module 402 may include in the header of the message a bit indicating a requested delay and another field may include an amount or a time of the requested delay. In this case, the message configuration module 402 may set a particular bit in the header of a message that is unused currently in a transmission protocol or is a particular bit in a new protocol. In some embodiments, the requested delay is the request to delay delivery of a message. For example, if a particular field in a header is blank, the message may be a standard message without delay and if the particular field includes the requested delay, the message is a message with a requested delay.

In another embodiment, the message configuration module 402 may configure a communication separate from the message with the requested delay and/or request to delay display of the message. For example, the message configuration module 402 may configure a communication with a requested delay to be sent just prior to sending an associated message. In another example, the message configuration module 402 may configure a communication with a requested delay and may reference a message that is sent later using an identifier so that the communication and the message can be identified as being connected. One of skill in the art will recognize other ways that the message configuration module 402 may configure an electronic message with request to delay displaying a message.

In one embodiment, the apparatus 400 includes a request transmission module 404 that transmits, to a computing device 110 over a digital communication network 106, a request to deliver a message with a requested delay. The computing device 110 includes a display and a processor to process electronic messages for display on the display. For example, the computing device 110 may be as described above in relation to the apparatus 200 of FIG. 2 and/or the apparatus 300 of FIG. 3.

In one example, the request includes the message with the requested delay. In this example, the request transmission module 404 may send a message configured by the message configuration module 402 to a computing device 110. In one embodiment, the apparatus 400 does not have information that the computing device 110 is configured to accept messages with a requested delay and the computing device 110 may or may not reject the message. In another embodiment, the apparatus 400 may have information that the computing device 110 is configured to accept a message with a requested delay. For example, the computing device 110 or third party with control over the computing device 110 may have previously been polled to see if the computing device 110 accepts messages with a requested delay and the computing device 110 or third party may have sent a response confirming that the computing device 110 accepts messages with a requested delay.

In another example, the request transmitted by the request message transmission module 404 includes a communication requesting confirmation that the computing device 110 is configured to accept messages with a requested delay. The apparatus 400 may include an immediate message transmission module 406 that that transmits the message with the requested delay after receiving a response that the computing device 110 is configured to receive messages with a requested delay. In this example, the immediate message transmission module 406 transmits the message with the requested delay in response to the request sent by the request transmission module 404 being the communication requesting confirmation that the computing device 110 is configured to receive a message with a requested delay (i.e. the request is not being the message with the requested delay).

In one embodiment, the immediate message transmission module 406 sends a message with a requested delay only when the request transmission module 404 sends a communication requesting confirmation that the computing device 110 is configured to receive messages with a requested delay and does not send the message with the requested delay. In another embodiment, a third party, such as a mobile phone carrier or other entity controlling a portion of the digital communication network 106 may respond by confirming that the computing device 110 accepts messages with a requested delay or by refusing messages with a requested delay.

In one embodiment, the apparatus 400 includes a delayed delivery module 408 that delays delivery to the computing device 110 of the message with the requested delay until after the requested delay after receiving a response with information that the computing device 110 is not configured to receive messages with a requested delay. For example, a computing device 110 may not be equipped to handle messages with a requested delay and may reject a message with a requested delay sent by the request transmission module 404. In another example, the computing device 110 may respond to a communication sent by the request transmission module 404 requesting confirmation that the computing device 110 is configured to accept messages with a requested delay.

When the apparatus 400 has information that a particular computing device 110 is not configured for messages with a requested delay, the delayed delivery module 408 may store the message for the requested delay period on a computer readable storage media accessible to the sending device 104 and may then transmit the message at the expiration of the requested delay. The request transmission module 404 and/or immediate message transmission module 406 may send a message with a requested delay to other computing devices known to be configured to accept messages with a requested delay.

In another embodiment, the delayed delivery module 408 is controlled by a server or other third party device within the digital communication network 106. For example, the message configuration module 402 and the request transmission module 404 may be at the sending device 104 and may send a message with a requested delay. A third party device may receive a request from the request transmission module 404 and may communicate with the computing device 110 to determine if the computing device 110 is configured to receive messages with a requested delay.

The third party device may include a request transmission module 404 to relay a request in the form of a communication requesting confirmation that the computing device 110 is configured to accept messages with a requested delay or a message with a requested delay to the computing device 110. The third party device may also include an immediate message transmission module 406 and a delayed delivery module 408 and may manage sending a message with a requested delay to the computing device 110 or sending a message after a requested delay, depending upon whether or not the computing device 110 accepts messages with a requested delay or not. One of skill in the art will recognize other ways to distribute and/or duplicate modules 402-408 of the apparatus 400 to offload some functionality of the delayed message sending apparatus 102.

Figure 5:
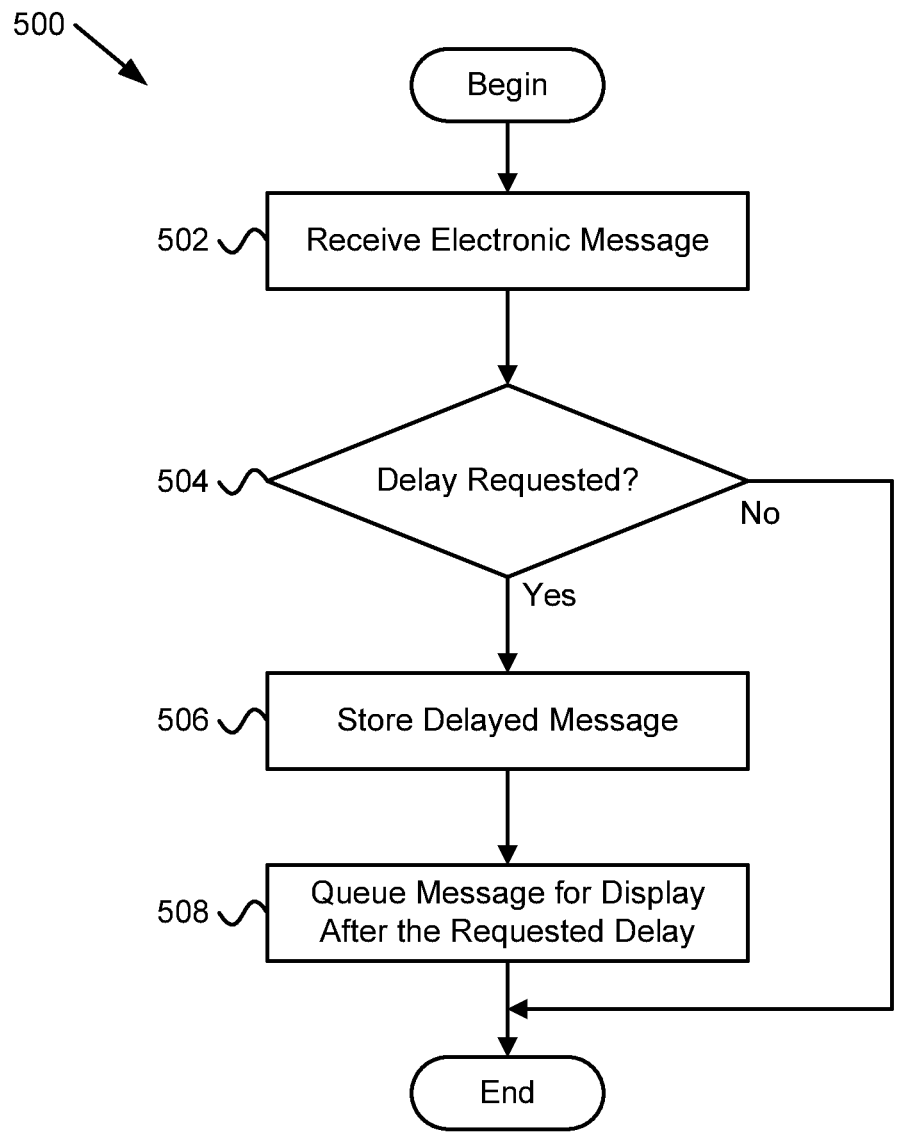
FIG. 5 is a schematic flow chart diagram illustrating one embodiment of a method for delayed messages.

FIG. 5 is a schematic flow chart diagram illustrating one embodiment of a method 500 for delayed messages. The method 500 begins and receives 502 an electronic message over a digital communication network, such as the digital communication network 106 depicted in the system 100 of FIG. 1. The message is received 502 at a computing device 110 with an electronic display and a processor to process electronic messages on the electronic display. In one embodiment, a receiver module 202 receives the message.

The method 500 determines 504 if the message includes a request to delay display of the message. The request includes a requested delay, for example by way of a particular date and/or by way of an amount of time for the delay. If the method 500 determines 504 that the message does not include a request to delay display of the message, the method 500 ends. If the method 500 determines 504 that the message does include a request to delay display of the message, the method 500 stores 506 the message on computer readable storage media, and then queues 508 the message for display after expiration of the requested delay. In one embodiment, the delay determination module 204 determines 504 if the message includes a requested delay. In another embodiment, the storage module 206 stores 506 the message and the display module 208 queues the message for display.

Figure 6:
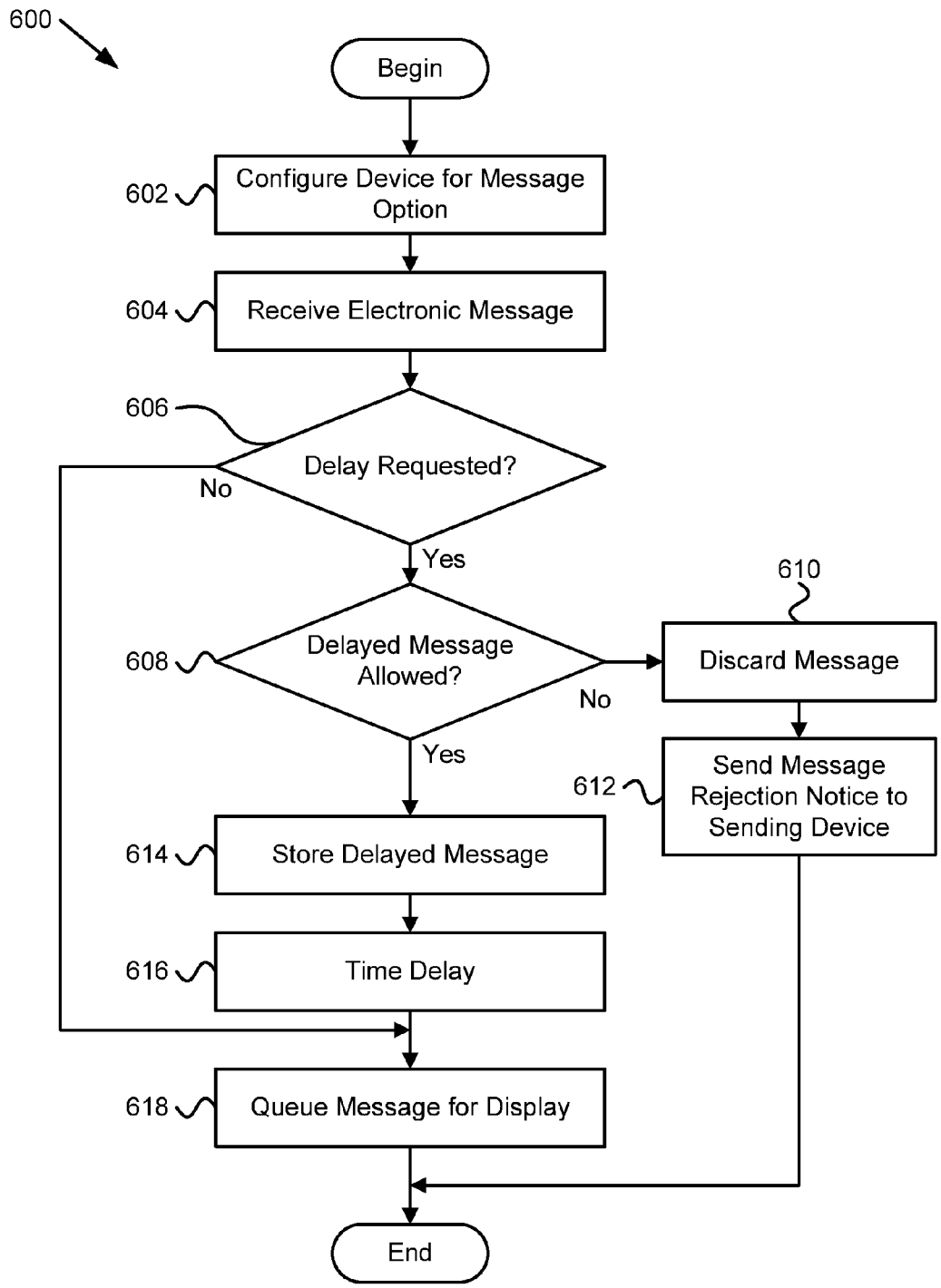
FIG. 6 is a schematic flow chart diagram illustrating a second embodiment of a method for delayed messages.

FIG. 6 is a schematic flow chart diagram illustrating a second embodiment of a method 600 for delayed messages. The method 600 begins and configures 602 the computing device 110 for accepting messages with a requested delay or not and the method 600 receives 604 an electronic message. In one embodiment, the delay acceptance module 302 configures 602 the computing device 110 to accept messages with a requested delay or configures 602 the computing device 110 to reject messages with a requested delay. In another embodiment, the receiver module 202 receives 604 the electronic message.

The method 600 determines 606 if the received message includes a requested delay. If the method 600 determines 606 that the received message includes a requested delay, the method 600 determines 608 if messages with a requested delay are allowed. If the method 600 determines 608 that messages with a requested delay are not allowed, the method 600 discards 610 the message and sends 612 a message rejection notice to the sending device 104, and the method 600 ends. The message rejection notice may be any form of communication that indicates to the sending device 104 that the computing device 110 does not accept messages with a requested delay. In one embodiment, the delay determination module 204 determines 606 if a message includes a requested delay and the delay acceptance module 302 determines 608 if messages with a requested delay are allowed. In another embodiment, the refusal module 304 sends the message rejection notice to the sending device 104.

If the method 600 determines 608 that messages with a requested delay are allowed, the method 600 stores 614 the message and waits 616 the requested delay. The method 600 then queues 618 the message for display and the method 600 ends. In one embodiment, the storage module 206 stores the message for the required delay and the display module 208 queues the message for display. If the method 600 determines 606 that the message does not include a requested delay, the method 600 queues 618 the message for display, and the method 600 ends.

Figure 7:
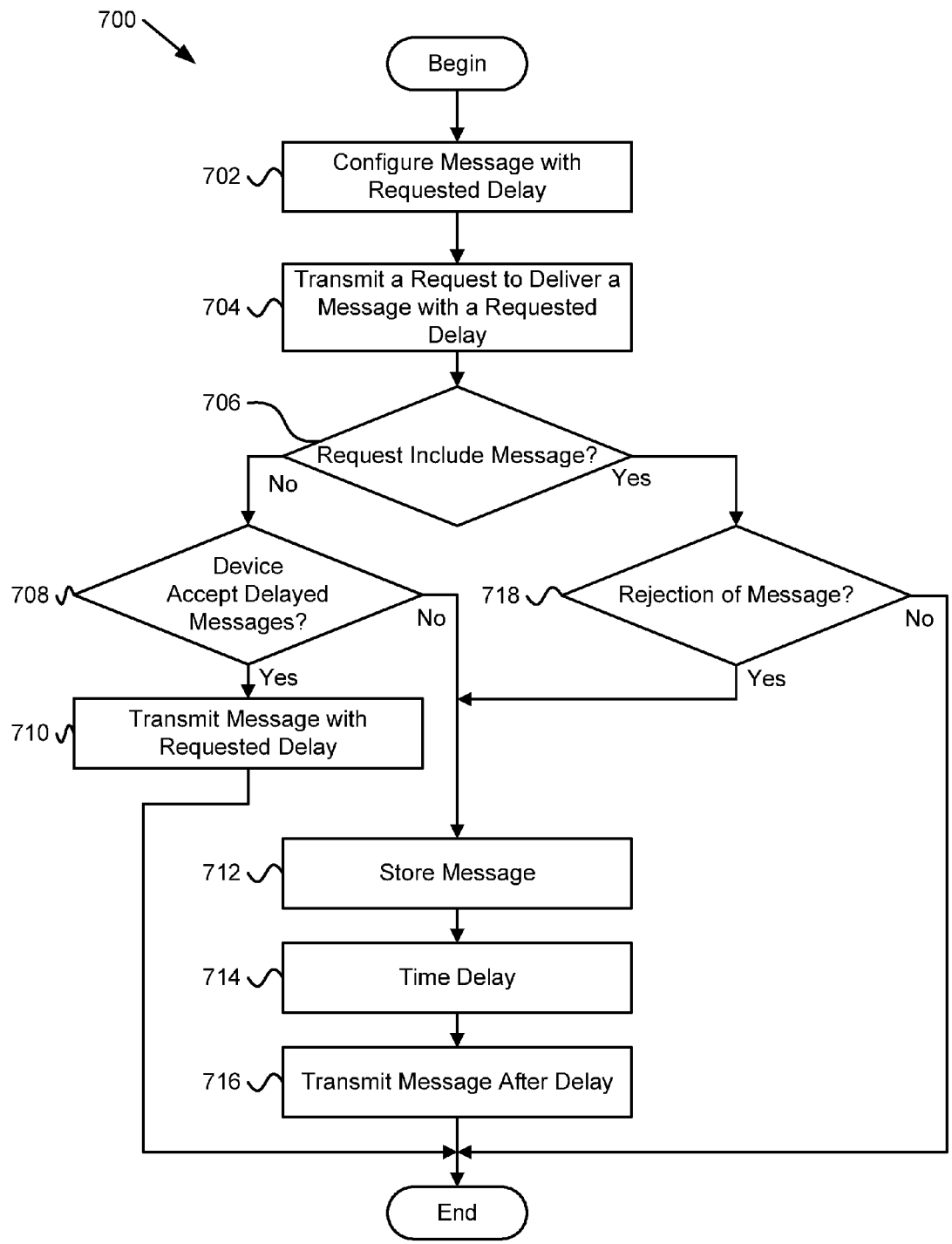
FIG. 7 is a schematic flow chart diagram illustrating a third embodiment of a method for delayed messages.

FIG. 7 is a schematic flow chart diagram illustrating a third embodiment of a method 700 for delayed messages. The method 700 begins and the method 700 configures 702 a message with a request to delay displaying the message. The request also includes a requested delay, which may be an amount of time, a particular date, a particular time, etc. In one embodiment, the message configuration module 402 configures 702 the message.

The method 700 transmits 704 a request to deliver a message with a requested delay. The request may be in the form of a message with the requested delay or a communication requesting confirmation that the computing device 110 is configured to accept messages with a requested delay. For example, the request transmission module 404 may transmit 704 the request. The method 700 determines 706 if the request includes a message. If the method 700 determines 706 that the request does not include a message, for example if the request is a communication requesting confirmation that the computing device 110 is configured to accept messages with a requested delay, the method 700 determines 708 if the computing device 110 accepts messages with a requested delay. For example, the computing device 110 may transmit a reply with information as to whether the computing device 110 accepts messages with a requested delay or not. In one embodiment, the request is the message configured by the message configuration module 402 and the transmission module 404 transmits the message. The requested delay of the message may serve as a request.

If the method 700 determines 708 that the computing device 110 accepts messages with a requested delay, the method 700 transmits 710 the message configured with the requested delay and the method 700 ends. If the method 700 determines 708 that the computing device 110 does not accept messages with a requested delay, the method 700 stores 712 the message with the requested delay and waits 714 for a time corresponding to the requested delay and transmits 716 the message after the requested delay and the method 700 ends. For example, the delayed delivery module 408 may store 712 the message for the requested delay and may transmit 716 the message after the requested delay. The delayed delivery module 408 may also determine 708 that the computing device 110 does not accept messages with a requested delay.

If the method 700 determines 708 that the request includes a message, for example if the request transmission module 404 transmits the message with the requested delay, the method 700 determines 718 if the message is rejected by the computing device 110. For example, the computing device 110 may send a reply that the message with the requested delay is rejected. If the method 700 determines 718 if the message is not rejected by the computing device 110, the method 700 ends. If the method 700 determines 718 that the message is rejected by the computing device 110, the method 700 stores 712 the message with the requested delay and waits 714 for a time corresponding to the requested delay and transmits 716 the message after the requested delay and the method 700 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product, the computer program product comprising a non-transitory computer readable storage medium having program instructions embodied therewith, the program instructions executable by a processor to cause the processor to:
receive an electronic message, the message is received over a digital communication network, the message received at a computing device, the computing device comprising an electronic display for a user to view electronic messages and a processor to process electronic messages for display on the on the electronic display; determine if the message comprises a request to delay displaying the message, the request comprising a requested delay; a storage module that stores store the message prior to queuing for display in response to the delay determination module determining that the message comprises a requested delay, the message is stored in a computer readable storage media accessible to the computing device; allow the computing device to one of accept messages with a requested delay and to reject messages with a requested delay; in response to rejecting messages with a requested delay, one or more of reject a message with a requested delay; and indicate a refusal after receiving a communication seeking to determine if the computing device is configured to receive messages with a requested delay; and in response to accepting messages with a requested delay, queue the message for display after the requested delay.

2. The computer program product of claim 1, wherein said rejecting a message with a requested delay comprises sending a reply to a sending device that sent the message with the requested delay, the reply comprising information that the computing device is not configured to receive messages with a requested delay.

3. The computer program product of claim 1, wherein the message comprises a short message service ("SMS") message.

4. The computer program product of claim 1, wherein the message comprises an email.

5. The computer program product of claim 1, wherein the requested delay comprises a specific time when the message is to be displayed.

6. The computer program product of claim 1, wherein the requested delay comprises an amount of time to delay display of the message.

7. The computer program product of claim 1, wherein the computing device comprising a mobile electronic device and the digital communication network comprises one or more of a mobile telephone network and a wireless network.

8. The computer program product of claim 1, further comprising the computing device and the display.

9. The computer program product of claim 1, wherein the requested delay is located in a message header associated with the message.

10. The computer program product of claim 1, wherein the requested delay is sent in a communication separate from the message, the communication comprising a reference to message.

11. A method for communication comprising: receiving an electronic message, the message received over a digital communication network, the message received at a computing device, the computing device comprising an electronic display for a user to view electronic messages and a processor to process electronic messages for display on the on the electronic display; determining if the message comprises a request to delay displaying the message, the request comprising a requested delay; storing the message prior to queuing for display in response to determining that the message comprises a requested delay, the message is stored in a computer readable storage media accessible to the computing device; configuring the computing device to one of accept messages with a requested delay and to reject messages with a requested delay; rejecting, in response to configuring the computing device to reject messages with a requested delay, one or more of a message with a requested delay; and a message seeking to determine if the computing device is configured to receive messages with a requested delay; and queuing, in response to the delay acceptance module configuring the computing device to accept messages with a requested delay, the message for display after the requested delay.

12. The method of claim 11, wherein rejecting a message with a requested delay comprises sending a reply to a sending device that sent the message with requested delay, the reply comprising information that the computing device is not configured to receive messages with a requested delay.

13. The method of claim 11, wherein the message comprises one of a short message service ("SMS") message and an email.

14. The method of claim 11, the requested delay comprises a specific time when the message is to be displayed.

15. The method of claim 11, wherein the requested delay comprises an amount of time to delay display of the message.

16. The method of claim 11, wherein the requested delay is located in a message header associated with the message.

17. The method of claim 11, wherein the requested delay is sent in a communication separate from the message, the communication comprising a reference to message.

18. A computer program product, the computer program product comprising a non-transitory computer readable storage medium having program instructions embodied therewith, the program instructions executable by a processor to cause the processor to: configure an electronic message with a request to delay displaying the message, the request comprising a requested delay; transmit, to a computing device over a digital communication network, a request to deliver a message with a requested delay, the request comprising one of the message with the requested delay; and a communication requesting confirmation that the computing device is configured to accept messages with a requested delay, the computing device comprising a display and a processor to process electronic messages for display on the display; transmit the message with the requested delay in response to receiving a response that the computing device is configured to receive messages with a requested delay and wherein the request comprises a communication requesting confirmation that the computing device is configured to receive a message with a requested delay; and delay delivery to the computing device of the message with the requested delay until after the requested delay in response to receiving a response comprising information that the computing device is not configured to receive messages with a requested delay.

19. The computer program product of claim 18, wherein the program instructions are further executable by a processor to cause the processor to store the message, prior to delivery to the computing device, on one of a computer readable storage media accessible to a sending device; and a computer readable storage media within the digital communication network.

20. The computer program product of claim 18, further comprising a user interface to allow a user to configure the requested delay.

* * * * *